US007907726B2

(12) United States Patent
Lauter et al.

(10) Patent No.: US 7,907,726 B2
(45) Date of Patent: Mar. 15, 2011

(54) PSEUDORANDOM NUMBER GENERATION WITH EXPANDER GRAPHS

(75) Inventors: Kristin E. Lauter, La Jolla, CA (US);
Denis X Charles, Redmond, WA (US);
Eyal Zvi Goren, Montreal (CA)

(73) Assignee: Microsoft Corporation, Redmond, WA (US)

( * ) Notice: Subject to any disclaimer, the term of this patent is extended or adjusted under 35 U.S.C. 154(b) by 1053 days.

(21) Appl. No.: 11/275,629

(22) Filed: Jan. 19, 2006

(65) Prior Publication Data

US 2007/0165846 A1  Jul. 19, 2007

(51) Int. Cl.
*G06F 7/58* (2006.01)
(52) U.S. Cl. .................. 380/46; 380/28; 380/29; 380/42
(58) Field of Classification Search .................... 380/28, 380/29, 42, 44, 46
See application file for complete search history.

(56) References Cited

U.S. PATENT DOCUMENTS 5,515,307 A * 5/1996 Aiello et al. ................. 708/254
2005/0220302 A1 * 10/2005 Mironov et al. .............. 380/42

OTHER PUBLICATIONS

A. Lubotzky, R. Phillips, P. Sarnak; Explicit Expanders and the Ramanujan Conjectures; 1986; ACM—Annual ACM Symposium on Theory of Computing; p. 242; http://portal.acm.org/citation.cfm?id=12154 http://delivery.acm.org/10.1145/20000/12154/p240-lubotzky.pdf?key1=12154&key2=0039541521&coll=GUIDE &dl=GUIDE&CFID=49197537&CFTOKEN=84639923.*
Guang Gong, Thomas A. Berson, and Douglas R. Stinson; Elliptic Curve Pseudorandom Sequence Generators; 2000; Springer Berlin/Heidelberg vol. 1758/2000; Lecture Notes in Computer Science—Selected Areas in Cryptography; p. 45; http://www.springerlink.com/content/2h1dkO3u7ntj1p8n/fulltext.pdf  http://www.springerlink.com/content/2h1dk03u7ntj1p8n/.*
A Pseudorandom Generator From Any One-Way Function Johan Hastad et al. http://citeseerx.ist.psu.edu/viewdoc/download?doi=10.1.1.36.6283&rep=rep1&type=pdf SIAM Journal on Computing; 1999 pp. 1-33.*
Sprng: A Scalable Library for Pseudorandom Number Generation Michael Mascagni et al. ACM Transactions on Mathematical Software; 2000 http://citeseerx.ist.psu.edu/viewdoc/download?doi=10.1.1.93.7326&rep=rep1&type=pdf pp. 1-13.*

* cited by examiner

*Primary Examiner* — Brandon S Hoffman
*Assistant Examiner* — Michelle Banihashemi
(74) *Attorney, Agent, or Firm* — Lee & Hayes, PLLC (57) ABSTRACT

Pseudorandom numbers may be generated from input seeds using expander graphs. Expander graphs are a collection of vertices that are interconnected via edges. Generally, a walk around an expander graph is determined responsive to an input seed, and a pseudorandom number is produced based on vertex names. Specifically, a next edge, which is one of multiple edges emanating from a current vertex, is selected responsive to an extracted seed chunk. The next edge is traversed to reach a next vertex. The name of the next vertex is ascertained and used as a portion of the pseudorandom number being produced by the walk around the expander graph.

18 Claims, 5 Drawing Sheets

FIG. 1

EXAMPLE
EXPANDER GRAPH

108(2)

(REGULAR GRAPH
WITH K=3)

PSEUDORANDOM NUMBER GENERATION WITH EXPANDER GRAPHS

BACKGROUND

Random numbers are useful in many different computing spheres. For example, most security protocols, which are employed in many business and commercial contexts, rely on random numbers. Unfortunately, acquiring truly random numbers using the mathematical logic and consequential predictability embodied in the circuitry of today's computing devices is a difficult prospect. Hence, pseudorandom numbers, which computing devices are capable of producing, are typically used in the real world.

Pseudorandom numbers tend to appear random, at least to a resource-constrained analysis. Pseudorandom number generation typically involves using an input seed of a first bit length to produce a pseudorandom number of a second bit length. The input seed is generally considered truly random. The second bit length of the pseudorandom number output is longer than the first bit length of the seed input due to some mathematical algorithm that is applied to the input seed. The effect is the production of a pseudorandom number sequence that may be employed with a security protocol or in some other context.

SUMMARY

Pseudorandom numbers may be generated from input seeds using expander graphs. Expander graphs are a collection of vertices that are interconnected via edges. Generally, a walk around an expander graph is determined responsive to an input seed, and a pseudorandom number is produced based on vertex names. Specifically, a next edge, which is one of multiple edges emanating from a current vertex, is selected responsive to an extracted seed chunk. The next edge is traversed to reach a next vertex. The name of the next vertex is ascertained and used as a portion of the pseudorandom number being produced by the walk around the expander graph.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other method, system, scheme, apparatus, device, media, procedure, API, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

As described herein, pseudorandom numbers may be generated using an expander graph. By way of example only, an input seed is used to determine a walk around an expander graph. The walk around the expander graph produces values that may be utilized as a pseudorandom number. Two sections are presented below: one section pertains to a relatively qualitative description, and the other section pertains to a relatively quantitative description. The sections are entitled "Example Qualitative Implementations for Pseudorandom Number Generation with Expander Graphs" and "Example Quantitative Implementations for Pseudorandom Number Generation with Expander Graphs".

Figure 1:
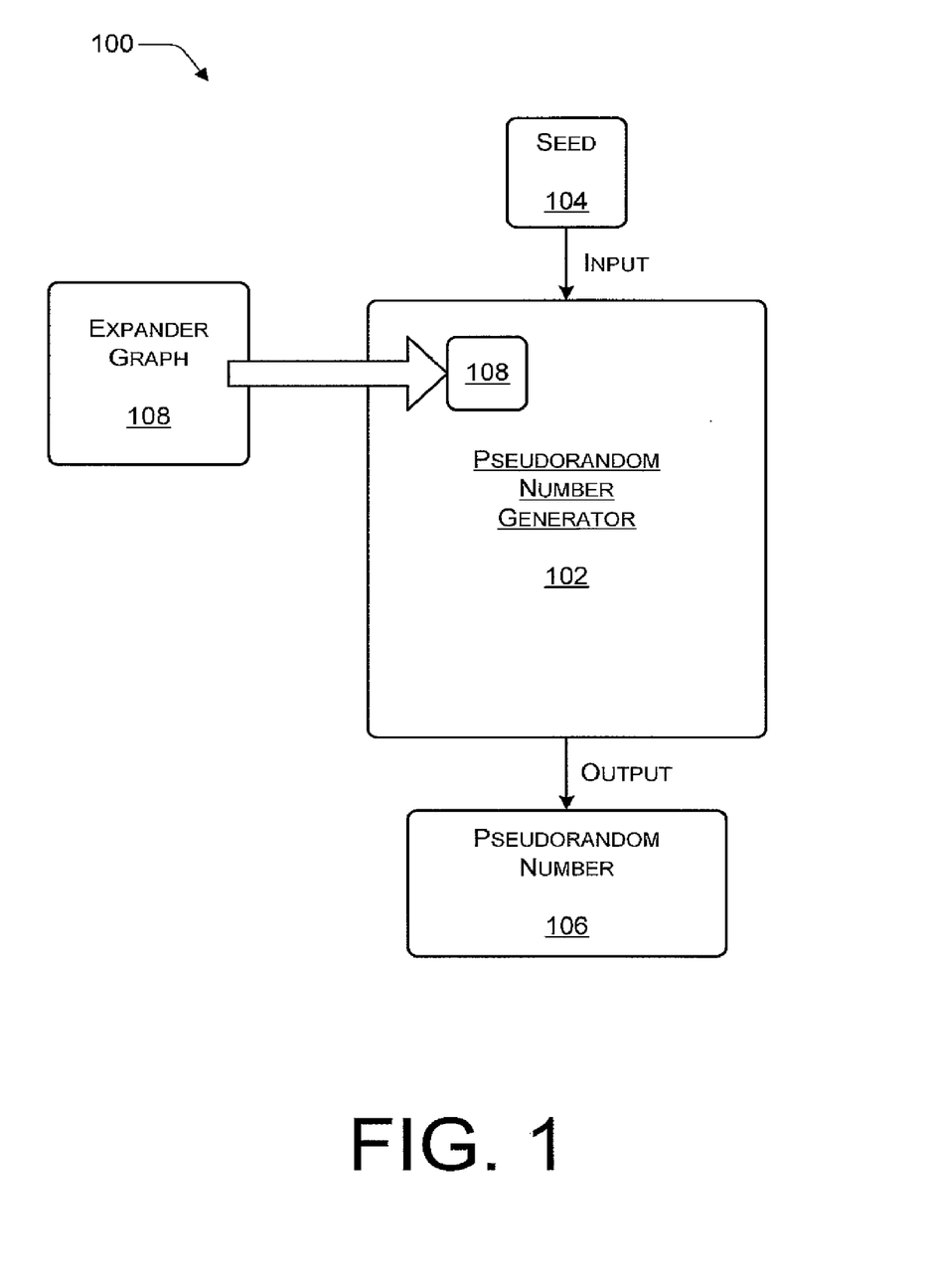
FIG. 1 is a block diagram of an example pseudorandom number generator that utilizes an expander graph.

Example Qualitative Implementations for Pseudorandom Number Generation with Expander Graphs FIG. 1 is a block diagram 100 of an example pseudorandom number generator 102 that utilizes an expander graph 108. As illustrated, block diagram 100 includes pseudorandom number generator 102, a seed 104, a pseudorandom number 106, and expander graph 108. In a described implementation, pseudorandom number generator 102 receives seed 104 as input and produces pseudorandom number 106 as output by utilizing expander graph 108. Pseudorandom number generator 102 may be realized as hardware, software, firmware, some combination thereof, and so forth.

Expander graph 108 is a collection of vertices or nodes and a collection of edges. The edges interconnect the vertices. A walk is taken around expander graph 108 by traversing edges between vertices. Seed 104 is used by pseudorandom number generator 102 to determine the path of the walk around expander graph 108. Identifiers of constituent parts of expander graph 108 are used to form portions of pseudorandom number 106.

An example of an expander graph 108 is described herein below with particular reference to FIG. 2. An example of a walk around an expander graph 108 as determined by a seed 104 to generate a pseudorandom number 106 is described herein below with particular reference to FIG. 3.

Generally, any type of expander graph 108 may be employed by pseudorandom number generator 102. Expander graphs are usually characterized as having a property that enables them to grow quickly from a given vertex to its neighbors and onward to other vertices. An example of a family of graphs that are considered to have good expansion properties are the so-called Ramanujan graphs. Although not required, pseudorandom number generation with an expander graph is facilitated by using an expander graph with good expansion properties along with a small degree (k), where the degree indicates the number of edges emanating from the vertices. These types of expander graphs can usually be described with a compact set of instructions.

Although not required, expander graphs that are so-called k-regular graphs are particularly amenable for use in generating pseudorandom numbers. These k-regular graphs are graphs that have the same number of edges emanating from each vertex. Moreover, two types of k-regular graphs are particularly amenable for use in generating pseudorandom numbers. These two examples of k-regular graph types are (i) supersingular elliptic curves expander graphs and (ii) Lubotzky-Philips-Sarnak (LPS) expander graphs. These two specific k-regular expander graph types, which are also examples of Ramanujan graphs, are described mathematically herein below in the quantitative section.

Figure 2:
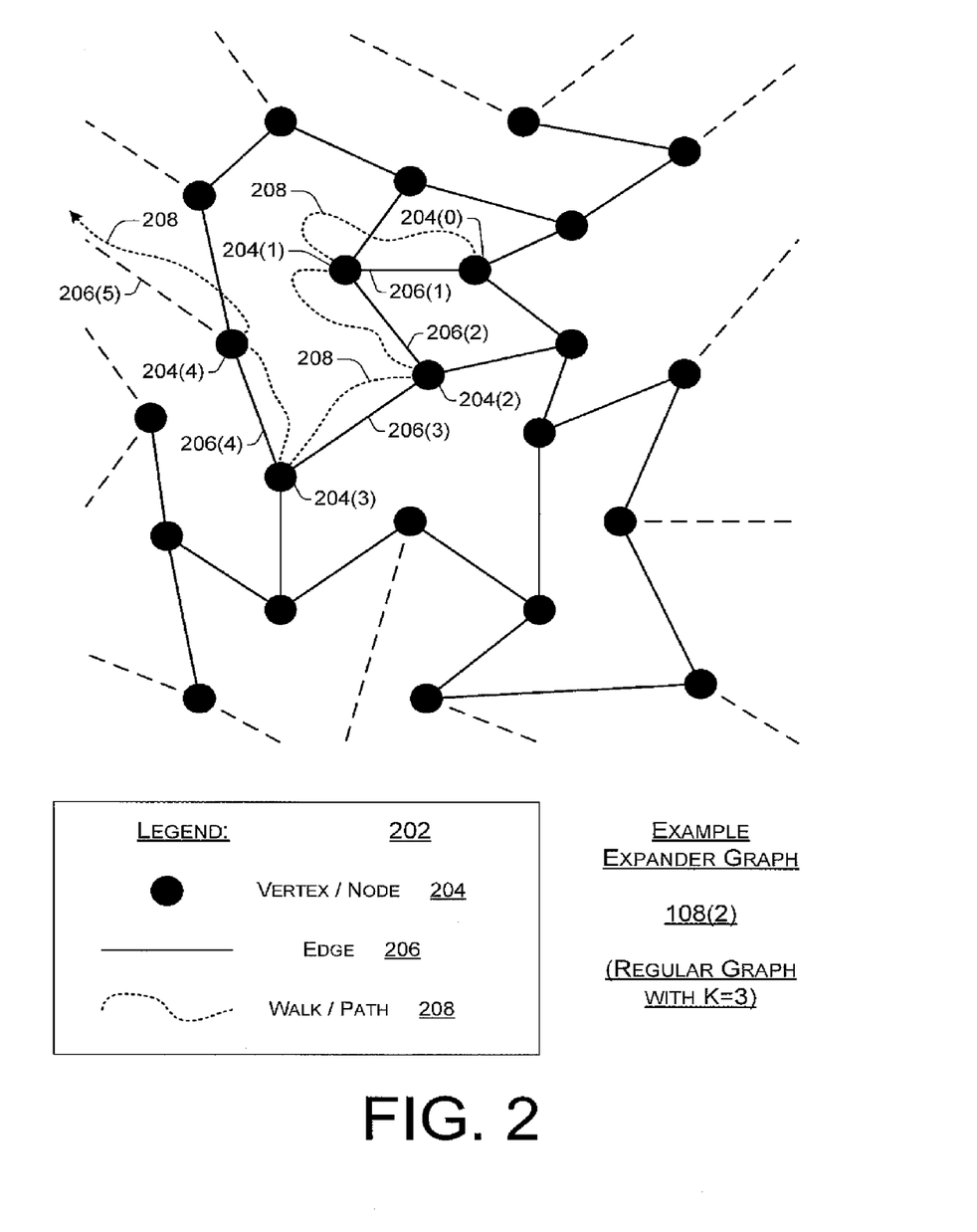
FIG. 2 illustrates an example expander graph.

FIG. 2 illustrates an example expander graph 108(2). A legend 202 indicates that each black circle represents a vertex or node 204, that each solid line represents an edge 206, and that a short-dashed line represents an example walk or path 208. As is apparent, each edge 206 interconnects two vertices 204. Only a portion of the overall example expander graph 108(2) is shown in FIG. 2 due to space limitations. An actual expander graph 108 may be much larger in practice. This is represented in expander graph 108(2) by the long-dashed lines emanating from some vertices 204 and extending outward to terminate at unseen vertices 204.

As illustrated, expander graph 108(2) is a k-regular graph with k=3. In other words, each vertex 204 has three edges 206 extending there from and therefore terminating thereat, depending on perspective and the direction of the walk. Hence, each vertex 204 is directly connected to three other neighbor vertices 204. Although a k=3 regular graph is used as an example herein, k may take any integer value (especially of three or larger).

Generally, walk 208 is shown starting at vertex 204(0) and extending beyond vertex 204(4). Specifically, example walk 208 traverses edges 206(1)-206(5) and includes vertices 204 (0) to 204(4). Walk 208 starts at vertex 204(0) and traverses edge 206(1) to reach vertex 204(1). From vertex 204(1), walk 208 traverses edge 206(2) to reach vertex 204(2). From vertex 204(2), walk 208 traverses edge 206(3) to reach vertex 204 (3). From vertex 204(3), walk 208 traverses edge 206(4) to reach vertex 204(4). From vertex 204(4), walk 208 traverses edge 206(5) to reach a vertex 204(5) (not explicitly shown in FIG. 2).

In a described implementation, walk 208 can continue traversing edges 206 to include other vertices 204 in walk 208 as long as seed 104 (of FIG. 1) may be used to provide direction for the path. The seed is used to select a next edge 206 to be traversed to reach a next vertex 204. With three edges 206 emanating from each vertex 204, there are three options for a next step or leg of a walk 208. Hence, with a k=3 regular graph, two bits from seed 104 are used for each next edge or step determination. Creating a walk on an expander graph 108 is described further below with particular reference to FIG. 3.

Figure 3:
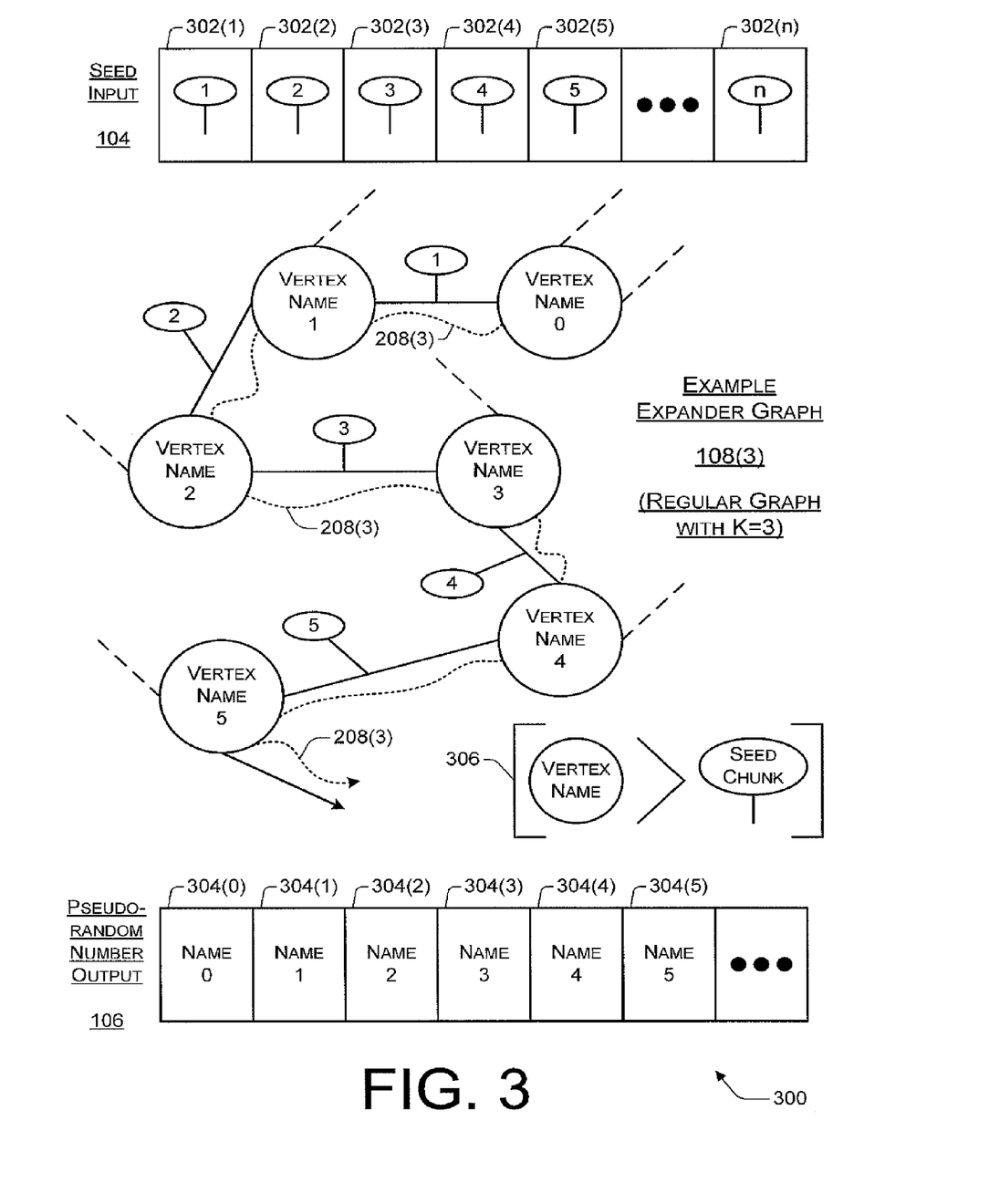
FIG. 3 is a block diagram of an example pseudorandom number generation scheme that utilizes an expander graph to output a pseudorandom number from an input seed.

FIG. 3 is a block diagram of an example pseudorandom number generation scheme 300 that utilizes an expander graph 108(3) to output a pseudorandom number 106 from an input seed 104. Generally, seed 104 is segmented into seed chunks 302, and pseudorandom number 106 is divided into pseudorandom number portions 304. Example expander graph 108(3) is a regular graph with k=3. However, the pseudorandom number generation principles described with reference to pseudorandom number generation scheme 300 are applicable to other k-regular expander graphs 108 and to expander graphs 108 generally.

To facilitate clarity, much of expander graph 108(3) is omitted from FIG. 3. The illustrated part of expander graph 108(3) includes six vertices that are represented as circles. Edges that interconnect the six illustrated vertices are represented by solid lines. Edges that emanate from the six illustrated vertices but terminate on un-illustrated edges are represented by large dashed lines. Each vertex is associated with a vertex name. The six vertices have six vertex names: name 0, name 1, name 2, name 3, name 4, and name 5. An example walk 208(3) is represented by short dashed lines.

Seed input 104 is segmented into seed chunks 302. Generally, seed input 104 is segmented into "n" chunks, with "n" being an integer. Specifically, seed input 104 includes seed chunk 302(1), seed chunk 302(2), seed chunk 302(3), seed chunk 302(4), seed chunk 302(5) . . . seed chunk 302(n). Graphically, each seed chunk 302 is represented by a balloon indicator having a numeral 1, 2, 3, 4, 5 . . . n.

In a described implementation, the size (e.g., the number of bits) of each seed chunk 302 is based on the degree of the expander graph being utilized to generate pseudorandom number 106. For example, the number of bits "h" per seed chunk 302 may be set to at least equal the number of bits "h" needed to individually identify one of the k edges emanating from each vertex ($2^h \geq k$). With a k=3 expander graph 108, each seed chunk 302 is therefore two bits long ($2^2 \geq 3$). In other words, an association is established between the available edges that emanate from a current vertex and the possible values for a seed chunk 302. The actual value of an extracted seed chunk 302 is used to determine the next edge from among the available edges using the association.

Pseudorandom number 106 is divided into multiple pseudorandom number portions 304. As illustrated, pseudorandom number 106 includes at least five pseudorandom number portions 304 that are vertex names. These at least five pseudorandom number portions 304 are: name 0 304(0), name 1 304(1), name 2 304(2), name 3 304(3), name 4 304(4), name 5 304(5) . . . . Pseudorandom number 106 thus comprises a concatenation of multiple vertex names. The size of pseudorandom number portion 304 is based on the length of each vertex name. The length of each vertex name is at least partially dependent on the type of expander graph 108 being utilized in the pseudorandom number generation. The overall size of pseudorandom number 106 is also based on the number of vertices traversed in a given walk around expander graph 108(3).

In a described implementation, seed input 104 is typically considered effectively truly random. An example source for seed input 104 is a processor or system clock value. Seed input 104 is stretched to produce a much longer pseudorandom number 106. This stretching is accomplished because a length of each vertex name or pseudorandom number portion 304 is greater than a length of each seed chunk 302. This is indicated graphically within brackets 306.

In operation, pseudorandom number generation scheme 300 involves a walk 208(3) around expander graph 108(3) in which each step is determined responsive to a seed chunk 302. An initial vertex can be determined by a fixed starting point, by selecting from a limited subset of vertices, by selecting from all vertices within expander graph 108(3), and so forth. If the initial vertex is selected, an initial portion of seed input 104 may be extracted and used to select it.

In example walk 208(3) along expander graph 108(3), the initial vertex is the vertex with name 0. Hence, name 0 is added to pseudorandom number 106 as pseudorandom number portion 304(0). Especially if the initial vertex is fixed, name 0 304(0) may be omitted from pseudorandom number 106.

Because expander graph 108(3) has a degree of k=3, there are three edges emanating from the name 0 vertex. A next edge to traverse to reach the next vertex is selected responsive to seed input 104. As illustrated, seed chunk 302(1) is extracted from seed 104. These bits are used to select one of the three edges emanating from the name 0 vertex as indicated by the balloon indicator having the numeral 1.

This step extends the path of walk 208(3) to the name 1 vertex. Hence, name 1 is added to pseudorandom number 106 as pseudorandom number portion 304(1). To select the next edge for the next step of walk 208(3), seed chunk 302(2) is extracted from seed 104. As shown, seed chunk 302(2) selects a next edge that leads to the name 2 vertex. Hence, name 2 is added to pseudorandom number 106 as pseudorandom number portion 304(2).

This process continues for pseudorandom number generation scheme 300. Seed chunk 302(3) is extracted and the next edge is selected responsive thereto. This step leads to the name 3 vertex, and name 3 is therefore added as pseudorandom number portion 304(3). By using seed chunk 302(4) to select the next edge, walk 208(3) is extended to the name 4 vertex. Hence, name 4 is added to pseudorandom number 106 as pseudorandom number portion 304(4). The edge leading to the name 5 vertex is selected responsive to seed chunk 302(5), and name 5 is concatenated onto pseudorandom number 106 as pseudorandom number portion 304(5). The process can continue while additional bits are desired for pseudorandom number 106 as long as bits of seed input 104 remain to be extracted as seed chunks 302.

Example vertex names are described herein below in the quantitative section. As noted above, the length of each vertex name is at least partially dependent on the type of expander graph being utilized in the pseudorandom number generation. The quantitative section also provides mathematical examples of the stretching ratio of the length of the seed input to the length of the pseudorandom number with a pseudorandom number generation scheme using an expander graph. The seed bits may also be separately exponentially stretched using a linear congruential scheme, which is described herein below in the quantitative section.

Figure 4:
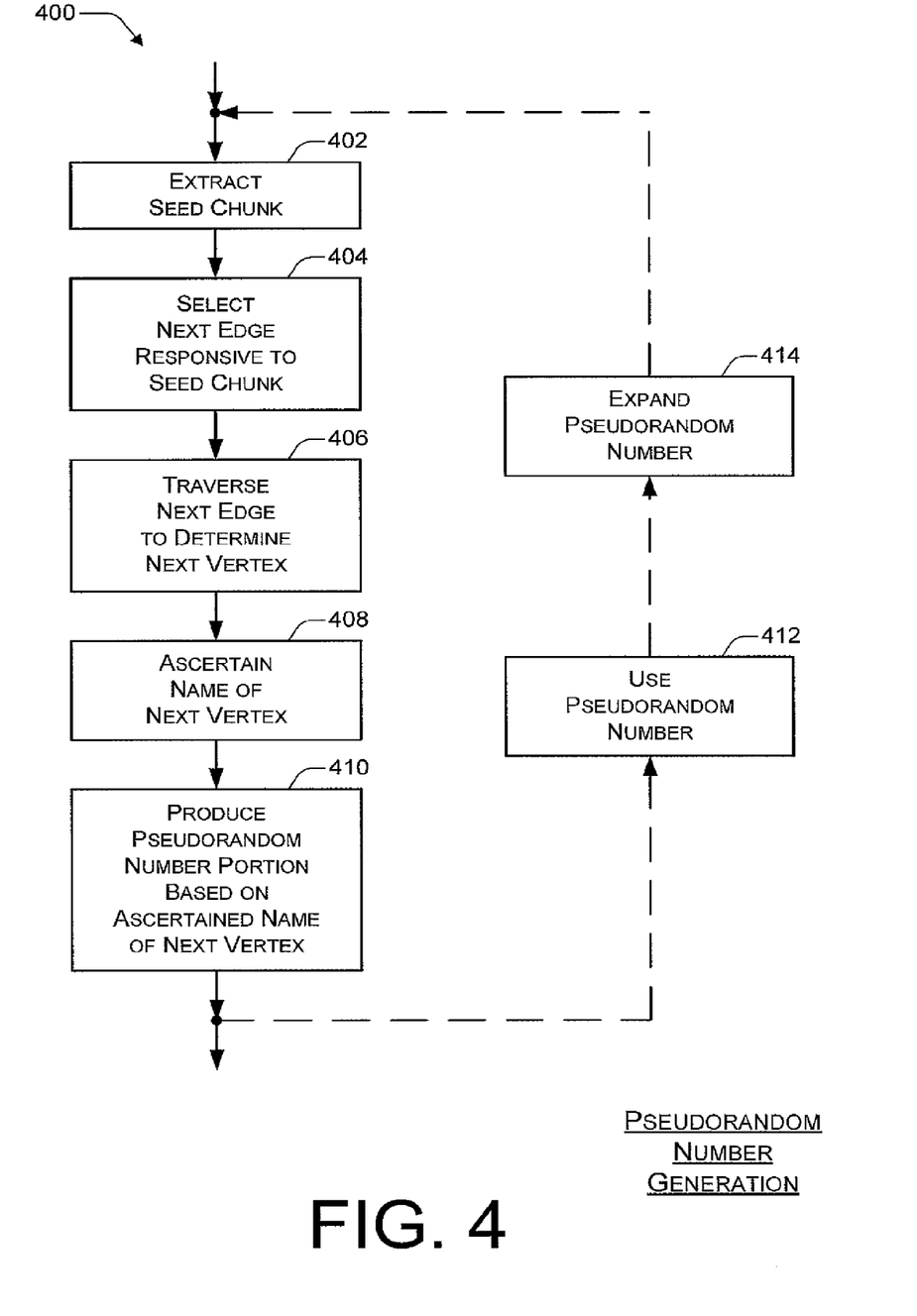
FIG. 4 is a flow diagram that illustrates an example of a method for generating a pseudorandom number from an input seed using an expander graph.

FIG. 4 is a flow diagram 400 that illustrates an example of a method for generating a pseudorandom number from an input seed using an expander graph. Flow diagram 400 includes seven (7) blocks 402-414. Although the actions of flow diagram 400 may be performed in other environments and with a variety of hardware and software combinations, a device 502 that is described herein below with particular reference to FIG. 5 may be used to implement the method of flow diagram 400. For example, pseudorandom number generator 102 as embodied in processor-executable instructions 510 may implement the described actions.

Other figures that are described herein above are referenced to further explain an example of the method. For example, a pseudorandom number generator 102 may implement the method using an expander graph 108 (of FIGS. 1 and 2). Additionally, the method may be implemented as part of a pseudorandom number generation scheme 300 (of FIG. 3). To provide a specific example for the method of flowchart 400, it is given that a current state of a walk 208(3) is located at the name 3 vertex of expander graph 108(3) (of FIG. 3).

At block 402, a seed chunk is extracted. For example, seed chunk 302(4) may be extracted from seed 104. At block 404, a next edge is selected responsive to the extracted seed chunk. For example, an edge that leads to the name 4 vertex may be selected responsive to seed chunk 302(4).

At block 406, the next edge is traversed to determine a next vertex. For example, the next edge that is selected responsive to seed chunk 302(4) may be traversed to determine that the next vertex is the name 4 vertex. At block 408, the name of the next vertex is ascertained. For example, "name 4" of the name 4 vertex may be ascertained. In the quantitative examples provided below in the quantitative section, the name of each vertex is dependent upon the type of expander graph 108 being used to generate a pseudorandom number 106.

At block 410, a pseudorandom number portion is produced based on the ascertained name of the next vertex. For example, pseudorandom number portion 304(4) may be produced based on the ascertained "name 4" of the name 4 vertex. This pseudorandom number portion 304(4) is concatenated onto the previously-produced pseudorandom number portions 304(0-3).

At block 412, the pseudorandom number is used. Generally, the pseudorandom number may be used for a variety of purposes in any of many different contexts. More specifically, the pseudorandom number may be used for security purposes, for quick sorting, for computing prime numbers, for approximate averaging, for some combination thereof, and so forth. With respect to security purposes, pseudorandom numbers may be used in cryptographic protocols that are facilitated with random numbers. Public key cryptography is an example relevant context for security in which authenticated key exchanges are performed using pseudorandom numbers. Pseudorandom numbers may also be used with digital signature algorithms.

At block 414, the pseudorandom number is expanded by continuing with flow diagram 400 at block 402. The expansion of pseudorandom number 106 may occur as long as desired while seed chunks 302 of seed 104 are still available.

Figure 5:
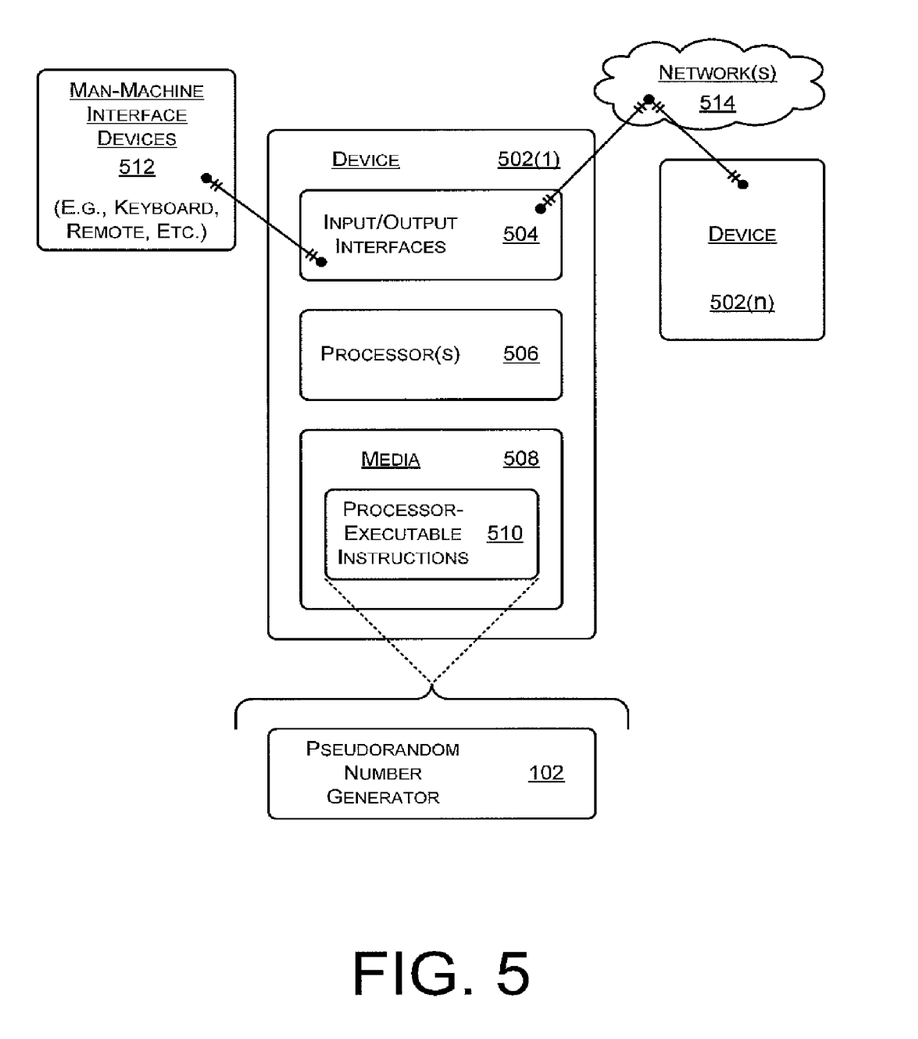
FIG. 5 is a block diagram of an example device that may be employed in conjunction with pseudorandom number generation using an expander graph.

FIG. 5 is a block diagram of an example device 502 that may be employed in conjunction with pseudorandom number generation using an expander graph. For example, a device 502 may execute or otherwise implement a pseudorandom number generator 102. In certain implementations, devices 502 are capable of communicating across one or more networks 514. As illustrated, two devices 502(1) and 502(n) are capable of engaging in communication exchanges via network 514. Example relevant communication exchanges include those relating to cryptography.

Generally, device 502 may represent a server device; a storage device; a workstation or other general computer device; a set-top box or other television device; a personal digital assistant (PDA), mobile telephone, or other mobile appliance; some combination thereof; and so forth. As illustrated, device 502 includes one or more input/output (I/O) interfaces 504, at least one processor 506, and one or more media 508. Media 508 includes processor-executable instructions 510. Although not specifically illustrated, device 502 may also include other components.

In a described implementation of device 502, I/O interfaces 504 may include (i) a network interface for communicating across network(s) 514, (ii) a display device interface for displaying information on a display screen, (iii) one or more man-machine device interfaces, and so forth. Examples of (i) network interfaces include a network card, a modem, one or more ports, and so forth. Examples of (ii) display device interfaces include a graphics driver, a graphics card, a hardware or software driver for a screen/television or printer, and so forth. Examples of (iii) man-machine device interfaces include those that communicate by wire or wirelessly to man-machine interface devices 512 (e.g., a keyboard or keypad, a mouse or other graphical pointing device, a remote control, etc.).

Generally, processor 506 is capable of executing, performing, and/or otherwise effectuating processor-executable instructions, such as processor-executable instructions 510. Media 508 is comprised of one or more processor-accessible media. In other words, media 508 may include processor-executable instructions 510 that are executable by processor 506 to effectuate the performance of functions by device 502.

Thus, realizations for pseudorandom number generation using an expander graph may be described in the general context of processor-executable instructions. Generally, processor-executable instructions include routines, programs, applications, coding, modules, protocols, objects, interfaces, components, metadata and definitions thereof, data structures, application programming interfaces (APIs), etc. that perform and/or enable particular tasks and/or implement particular abstract data types. Processor-executable instructions may be located in separate storage media, executed by different processors, and/or propagated over or extant on various transmission media.

Processor(s) 506 may be implemented using any applicable processing-capable technology. Media 508 may be any available media that is included as part of and/or accessible by device 502. It includes volatile and non-volatile media, removable and non-removable media, and storage and transmission media (e.g., wireless or wired communication channels). For example, media 508 may include an array of disks for longer-term mass storage of processor-executable instructions, random access memory (RAM) for shorter-term storage of instructions that are currently being executed, flash memory for medium to longer term storage, optical disks for portable storage, and/or link(s) on network 514 for transmitting communications, and so forth.

As specifically illustrated, media 508 comprises at least processor-executable instructions 510. Generally, processor-executable instructions 510, when executed by processor 506, enable device 502 to perform the various functions described herein, including those that are illustrated in scheme 300 and flow diagram 400 (of FIGS. 3 and 4, respectively). By way of example only, processor-executable instructions 510 may include all or part of a pseudorandom number generator 102.

Example Quantitative Implementations for Pseudorandom Number Generation with Expander Graphs In certain implementations as described herein, pseudorandom number generation involves taking random walks on expander graphs. Expander graphs with good expansion properties are particularly adaptable to generating pseudorandom numbers. One family of expander graphs with good expansion properties are Ramanujan graphs. As noted herein above, pseudorandom number generation is also facilitated using regular graphs, especially regular graphs having a relatively low degree (i.e., a relatively small number of interconnecting edges per vertex). Two example graphs that are both regular and Ramanujan graphs are (i) expander graphs formed from supersingular elliptic curves and (ii) Lubotzky-Philips-Sarnak (LPS) expander graphs. These two example expander graphs are addressed mathematically below in individual subsections.

This and the succeeding paragraph present a concise, relatively non-rigorous explanation of how and why walks on expander graphs behave in a pseudorandom fashion and generally entail pseudorandom properties. On any k-regular connected graph a random walk converges to a uniform distribution on the vertices; that means that the likelihood of reaching any vertex given a sufficiently long random walk is the same, equal to one over the number of vertices. The key property of good expander graphs, and among them the Ramanujan graphs are optimal in that regard, is the speed of convergence to that uniform distribution.

Given a probability distribution on the vertices of a k-regular connected graph, namely given for each vertex the likelihood of the process beginning at this vertex, the rate of convergence to the uniform probability distribution is controlled by the size of the gap between the eigenvalue 1 and the other eigenvalues of the normalized adjacency matrix of the graph. For an expander graph this gap is large enough so that this convergence to the uniform distribution occurs in a logarithm of the number of vertices many steps. The property of the gap between the leading eigenvalue and the others being large is the defining property of Ramanujan graphs, of which the two example graphs describe herein are instances. Thus, heuristically, in the example graphs a relatively short (with respect to the number of vertices and degree k) random walk on the graph, as is carried out in the processes described herein, shall converge rapidly (relative to the same parameters) to a uniform distribution and so the likelihood of reaching any vertex is close to being the same.

Supersingular Elliptic Curve Expander Graphs

An example family of supersingular elliptic curve expander graphs is defined as follows. It is given that p is a prime number and that l ($\neq$p) is another prime number. The graph G(p, l) has as its vertex set V the set of supersingular j-invariants over the finite field $F_{p^2}$. There is an edge between the vertex $j_1$ and $j_2$ if there is an isogeny of degree l between the supersingular elliptic curves whose j-invariants are $j_1$ and $j_2$. The graph G(p, l) is therefore established to be an example of an l+1 regular Ramanujan graph. The following paragraphs of this subsection describe the construction of a pseudorandom number generator 102 that uses supersingular elliptic curve expander graphs. This also entails describing how to navigate the graph G(p, l).

The graph is constructed as follows. It is given that $j_0, \ldots, i_{k-1}$ are the vertices of the graph G(p, l). Because the number of vertices, k, of the graph is equal to the class number of the definite quaternion algebra ramified only at p and at infinity, only $\log_2(k)$ bits are needed to specify a vertex. However, the j-invariants are given a priori as elements of $F_{p^2}$ written as a pair (a,b) of elements of $F_p$. The j-invariant may be considered as a pair of natural numbers (a,b) mod p. Applying, e.g., a 2-universal hash function to the concatenation of a and b produces a bit string of length ceil($\log_2(2k)$)+1.

More specifically, although there are k vertices, the names for the vertices occupy 2 log p bits instead of log k bits. Because the number of vertices is known a priori, an appropriate hash function can be applied to reduce the number of bits consumed by the names of the vertices. The result of applying such a universal hash function is called u, and the vertices of the graph are relabeled $u(j_0), \ldots u(j_{k-1})$.

Generally, the graph is navigated for a walk to generate a pseudorandom number as follows. It is given that $\sigma$ is the seed of the pseudorandom number generator and that s is the number of steps that can be taken for the walk. While log k bits of the seed $\sigma$ are used to determine the starting vertex, h bits of the seed $\sigma$ are consumed at each step. (If the starting vertex is fixed, then it can be assumed that $\sigma$ is of length h*s.) The value of $\sigma$ is considered to be an element of $\{0, 1\}^{h*s+\log_2(k)}$ (i.e., a string of 0's and 1's of length h*s+$\log_2(k)$, where h=ceil($\log_2(l+1)$)+1). It is also given that $\sigma_0$ is the first $\log_2(k)$ bits of $\sigma$.

The output of the pseudorandom number generator with an input of the seed $\sigma$ is defined as follows: In stage 0, the starting vertex is $v_0=j_{\sigma_0}$, and the output is $\sigma_0$. At stage i, for 0<i≦s, the block of h-bits $\sigma_i$ of $\sigma$ starting from the (h*(i−1)+$\log_2(k)$+1)-th bit to the (h*i+$\log_2(k)$)-th bit is used to determine the next vertex in the graph as follows. Because G(p, l) is an l+1 regular graph the vertex $v_{i-1}$ has l+1 edges emanating from it. These edges are labeled from 0 through l. The seed chunk $\sigma_i$ is used to determine which edge is traversed from the vertex $v_{i-1}$ to $v_i$. If the vertex $v_i$ is the supersingular elliptic curve with j-invariant $j_r$, the output of the pseudorandom number generator at stage i is defined to be $u(j_r)$.

The pseudorandom number generator stretches the h*s+log(k) bits of the seed to s*(log(2 k)+1) bits. The size of the graph G(p, l) is known to be about p/12, and so log(k) is O(log p). Thus, s*log(l)+O(log(p)) bits are being stretched to about s*log(p) bits. When l is very small in comparison to p, this is a considerable factor of stretching. Hence, a seed input can be stretched relatively farther when the supersingular elliptic curve expander graph is established to have p>>l.

A specific mathematical approach to taking a walk around a supersingular elliptic curve expander graph is as follows. For the expander graph whose nodes are supersingular elliptic curves modulo a prime p, and its edges are isogenies of degree t between elliptic curves, the steps of a walk around the graph can be taken as follows:

Beginning at a node corresponding to the elliptic curve E, first find generators P and Q of the l-torsion of E[l]. To this end:
1. Let n be such that $F_q(E[l]) \subseteq F_{q^n}$.
2. Let $S=\acute{e}E(F_{q^n})$, the number of $F_{q^n}$ rational points on E.
3. Set $s=S/l^k$, where $l^k$ is the largest power of l that divides S (note $k \geq 2$).
4. Pick two points P and Q at random from E[l]:
   (a) Pick two points U, V at random from $E(F_{q^n})$.
   (b) Set P'=sU and Q'=sV if either P' or Q' equals O then repeat step (a).
   (c) Find the smallest $i_1, i_2$ such that $l^{i_1}P' \neq O$ and $l^{i_2}Q' \neq O$ but $l^{i_1+1}P'=O$ and $l^{i_2+1}Q'=O$.
   (d) Set $P=l^{i_1}P'$ and $Q=l^{i_2}Q'$.
5. Using the well-known Shanks's Baby-steps-Giant-steps algorithm, determine if Q belongs to the group generated by P. If so, step (4) is repeated.

The j-invariants in $F_{p^2}$ of the l+1 elliptic curves that are isogenous to E are $j_1, \ldots, j_{l+1}$. They can be found as follows:
(a) Let $G_1 = \langle Q \rangle$ and $G_{1-i} = \langle P+(i-1)*Q \rangle$ for $1 \leq i \leq l$.
(b) For each i, $1 \leq i \leq l+1$ compute the j-invariant of the elliptic curve $E/G_i$ using Vélu's formulas.

If the graph of supersingular elliptic curves with 2-isogenies is used, for example, a random walk can be taken in the following explicit way: at each step, after finding the three non-trivial 2-torsion points of E, they are ordered in terms of their x-coordinates in a pre-specified manner. The input bits are then used to determine which point to select to quotient the elliptic curve by in order to get to the next vertex or node in the walk.

Lubotzky-Philips-Sarnak (LPS) Expander Graphs

Another Ramanujan graph that may be used by a pseudorandom number generator is the Lubotzky-Philips-Sarnak (LPS) expander graph This example expander graph is described in this subsection The construction of an LPS expander graph is accomplished as follows. It is given that l and p are two distinct primes, with l a relatively small prime and p a relatively large prime. It is also established that p and l are $\equiv 1 \mod 4$ and that the l is a quadratic residue mod p (i.e., that $l^{(p-1)/2} \equiv 1 \mod p$). The LPS graph, with parameters l and p, is denoted by $X_{l,p}$.

The vertices that make up the graph $X_{l,p}$ are defined as follows. The vertices of $X_{l,p}$ are the matrices in a projective special linear (PSL) group. More specifically, the vertices of $X_{l,p}$ are the matrices in $PSL(2,F_p)$, which are invertible 2×2 matrices with entries in $F_p$ that have a determinant of 1 together with the equivalence relation A=-A for any matrix A. Given a 2×2 matrix A with determinant 1, the name for the vertex is the 4-tuple of entries of A or -A, depending on which is lexicographically smaller in the usual ordering of the set $\{0, \ldots, p-1\}^4$.

The edges that make up the graph $X_{l,p}$ are defined as follows. Each matrix A is connected to the matrices $g_iA$ where the $g_i$'s are the following explicitly defined matrices: It is given that I is an integer satisfying $I^2 \equiv -1 \mod p$. There are exactly 8(l+1) solutions $g=(g_0, g_1, g_2, g_3)$ to the equation $g_0^2+g_1^2+g_2^2+g_3^2=l$. Among these 8(l+1) solutions, there are exactly l+1 with (i) $g_0$ both >0 and odd and (ii) $g_j$ even for j=1, 2, 3 . . . .

To each such g, the following matrix is associated:

$$\begin{bmatrix} g_0 + Ig_1 & g_2 + Ig_3 \\ -g_2 + Ig_3 & g_0 - Ig_1 \end{bmatrix}.$$

This results in a set S of l+1 matrices in $PSL(2,F_p)$. The $g_i$'s are the matrices in this set S. Under these constraints, if g is in S, then so is $g^{-1}$. Furthermore, because l is small, the set of matrices in S can be found by exhaustive search very quickly. Each possible seed chunk value can therefore be associated with each edge that corresponds to a directly-connected matrix $g_iA$, with g being in the set S. The actual value of an extracted seed chunk can be used to select the associated edge and thus determine the next step to the next vertex, with the next vertex corresponding to a matrix with a 4-tuple name that is to be used as a portion of a pseudorandom number output.

Example Alternative Implementation for Pseudorandom Number Generator

Regardless of the type of expander graph used by a pseudorandom number generator, the input seed can be stretched exponentially using the following technique. Although the pseudorandom number output is consequently longer with this technique (and exponentially so), the walk around a given expander graph becomes merely pseudorandom.

To exponentially stretch an input seed, a linear congruential scheme is employed. In an example of this implementation, a finite field $F_q$ having a size approximately l is used; a and b are elements of $F_q$. The starting vertex $v_0$ is also fixed. It is given that $x_0$ in $F_q$ is the seed. From $v_0$ the edge labeled $x_0$ is used to determine $v_1$. At stage i, $x_j$ is set by: $x_i=a*x_{i-1}+b$. Also, $x_j$ is used to determine $v_i$ with $v_i$ being the output. The seed size becomes log(l), and the output size becomes log(p) *l. Thus, the stretching factor is (log(p)*l)/log(l).

The exponential stretching using a linear congruential scheme may be employed in one of at least two different ways. First, the linear congruential scheme may be applied to lengthen the overall seed 104, with the lengthened seed then being used to take a pseudorandom walk around a given expander graph 108. Second, the linear congruential scheme may be applied to lengthen individual seed chunks 302, with each lengthened seed chunk being used to determine a greater number of steps of the overall walk around a given expander graph 108 as compared to an un-lengthened seed chunk.

The devices, actions, aspects, features, functions, procedures, modules, data structures, schemes, architectures, components, etc. of FIGS. 1-5 are illustrated in diagrams that are divided into multiple blocks. However, the order, interconnections, interrelationships, layout, etc. in which FIGS. 1-5 are described and/or shown are not intended to be construed as a limitation, and any number of the blocks can be modified, combined, rearranged, augmented, omitted, etc. in any manner to implement one or more systems, methods, devices, procedures, media, apparatuses, APIs, arrangements, etc. for pseudorandom number generation using an expander graph.

Although systems, media, devices, methods, procedures, apparatuses, techniques, schemes, approaches, arrangements, and other implementations have been described in language specific to structural, logical, algorithmic, and functional features and/or diagrams, it is to be understood that the invention defined in the appended claims is not necessarily limited to the specific features or acts described above. Rather, the specific features and acts described above are disclosed as example forms of implementing the claims.

What is claimed is:

1. A method comprising:
   identifying, by a device including a processor to implement a pseudo-random number generator, an initial vertex of an expander graph formed from a plurality of supersingular elliptic curves;
   increasing a length of a seed input exponentially using a linear congruential scheme;
   extracting, by the device, a seed chunk from the seed input, the seed input including a plurality of chunks;
   selecting, by the device, a next edge of the expander graph responsive to the seed chunk, the next edge being one of a plurality of edges coupled to the initial vertex;
   determining, by the device, a next vertex of the expander graph by identifying three non-trivial 2-torsion points of a supersingular elliptic curve, ordering the three non-trivial 2-torsion points in a pre-specified manner based on respective x-coordinates of the three non-trivial 2-torsion points, and utilizing the seed input to determine one of the three non-trivial 2-torsion points to apply to the supersingular elliptic curve to determine the next vertex;
   and
   producing, by the device, a pseudorandom number portion based on a name of the next vertex, the pseudorandom number portion being one of a plurality of pseudorandom number portions comprising a pseudorandom number.

2. The method as recited in claim 1, wherein the seed chunk comprises a length of bits that is sufficient to represent the plurality of edges.

3. The method as recited in claim 1, further comprising:
   traversing an additional next edge to reach an additional supersingular elliptic curve; and
   ascertaining the name of an additional next vertex, the name comprising a j-invariant of the additional supersingular elliptic curve.

4. The method as recited in claim 1, further comprising:
   extracting another seed chunk from the seed input;
   selecting another edge of the expander graph responsive to the other seed chunk;
   traversing the other edge of the expander graph to determine another vertex; and
   producing another pseudorandom number portion based on a name of the other vertex.

5. A device comprising:
   a processor;
   an expander graph having vertices that are interconnected by edges, each vertex connected by edges to at least two other vertices;
   an input seed including a plurality of chunks; and
   a pseudorandom number generator executable by the processor to:
      increase a length of a portion of the plurality of seed chunks using a linear congruential scheme to produce lengthened seed chunks and un-lengthened seed chunks;
      take a walk over multiple vertices of the expander graph by traversing edges responsive to the plurality of chunks of the input seed;
      determine a first number of vertices of the expander graph that are traversed during the walk for at least one of the un-lengthened seed chunks;
      determine a second number of vertices of the expander graph that are traversed during the walk for at least one of the lengthened seek chunks, the second number of vertices is greater than the first number of vertices; and
      produce a pseudorandom number including a plurality of pseudorandom number portions, each pseudorandom number portion being produced based on a name of a respective vertex of the expander graph that is traversed during the walk.

6. The device as recited in claim 5, each respective name of the multiple vertices depends on a type of the expander graph.

7. The device as recited in claim 5, wherein the expander graph comprises a Ramanujan expander graph.

8. The device as recited in claim 5, wherein the expander graph comprises a regular graph in which each vertex of the expander graph is connected to an identical number of other vertices of the expander graph.

9. The device as recited in claim 5, wherein the expander graph comprises an elliptic curve expander graph in which each vertex corresponds to an elliptic curve.

10. The device as recited in claim 5, wherein the expander graph comprises a supersingular elliptic curve expander graph in which each vertex corresponds to a supersingular elliptic curve.

11. The device as recited in claim 10, wherein each respective vertex is represented by a respective j-invariant that identifies the respective supersingular elliptic curve that corresponds to the respective vertex.

12. The device as recited in claim 11, wherein each j-invariant comprises a pair of numbers (a, b) mod p, with p being a prime number characterizing the expander graph.

13. The device as recited in claim 5, wherein the expander graph comprises a Lubotzky-Phillips-Sarnak (LPS) expander graph in which each vertex corresponds to a matrix.

14. The device as recited in claim 13, wherein each respective vertex is represented by a respective 4-tuple derived from a respective 2×2 matrix that corresponds to the respective vertex.

15. One or more processor-accessible storage media, not including transmission media, wherein the one or more processor-accessible storage media comprises processor-executable instructions that include a pseudorandom number generator that, when executed, performs acts comprising:
   increasing a length of a first seed input for a supersingular elliptic curve expander graph and a length of a second seed input for a Lubotzky-Phillips-Sarnak expander graph using a linear congruential scheme;
   identifying a current vertex of an the supersingular elliptic curve expander graph and the Lubotzky-Phillips-Sarnak expander graph;
   extracting a respective seed chunk from the first seed input and the second seed input, the first seed input and the second seed input each including a plurality of chunks;
   selecting a first next edge of an the supersingular elliptic curve expander graph responsive to the respective seed chunk of the first seed input, the first next edge being one of a plurality of edges coupled to the current vertex of the supersingular elliptic curve expander graph;
   selecting a second next edge of the Lubotzky-Phillips-Sarnak expander graph responsive to the respective seed chunk of the second seed input, the second next edge being one of a plurality of edges coupled to the current vertex of the Lubotzky-Phillips-Sarnak expander graph;
   determining a next vertex of the supersingular elliptic curve expander graph by identifying three non-trivial 2-torsion points of a supersingular elliptic curve, ordering the three non-trivial 2-torsion points in a pre-specified manner based on respective x-coordinates of the three non-trivial 2-torsion points, and utilizing the first seed input to determine one of the three non-trivial 2-torsion points to apply to the supersingular elliptic curve to determine the next vertex;

computing a j-invariant of the supersingular elliptic curve using Velu's formulas;

traversing the next edge of the Lubotzky-Phillips-Sarnak expander graph to determine a next vertex of the Lubotzky-Phillips-Sarnak expander graph;

producing a first pseudorandom number portion based on a name of the next vertex of the supersingular elliptic curve expander graph and a second pseudorandom number portion based on a name of the next vertex of the Lubotzky-Phillips-Sarnak expander graph;

adding the first pseudorandom number portion to a first plurality of additional pseudorandom number portions to produce a first pseudorandom number, each of the first plurality of additional pseudorandom number portions being associated with a name of a respective vertex of the supersingular elliptic curve expander graph;

adding the second pseudorandom number portion to a second plurality of additional pseudorandom number portions to produce a second pseudorandom number, each of the second plurality of additional pseudorandom number portions being associated with a name of a respective vertex of the Lubotzky-Phillips-Sarnak expander graph; and applying a hash function to reduce a number of bits consumed by names of vertices of the supersingular elliptic curve expander graph when a number of vertices of the supersingular elliptic curve expander graph is known.

16. The one or more processor-accessible storage media as recited in claim 15, wherein the acts further comprise establishing an association between respective potential seed chunk values and respective edges emanating from a current vertex of the supersingular elliptic curve expander graph, and wherein the next edge of the supersingular elliptic curve expander graph is selected responsive to an actual seed chunk value using the established association.

17. The one or more processor-accessible storage media as recited in claim 16, wherein the acts further comprise ascertaining the name of the next vertex of the supersingular elliptic curve expander graph.

18. The one or more processor-accessible storage media as recited in claim 15, wherein the acts further comprise taking a walk over at least a portion of multiple vertices of the supersingular elliptic curve expander graph by traversing interconnecting edges between a plurality of vertices of the supersingular elliptic curve expander graph responsive to the seed input, and wherein the first pseudorandom number portions for the first pseudorandom number are based on names of vertices over which the walk is taken.

\* \* \* \* \*